United States Patent [19]

Ueoka et al.

[11] 4,022,716
[45] May 10, 1977

[54] SEMICONDUCTING CERAMICS CONTAINING VANADIUM OXIDE

[75] Inventors: Hisayoshi Ueoka, Ichikawa; Masatada Yodogawa, Tokyo, both of Japan

[73] Assignee: TDK Electronics Company, Limited, Tokyo, Japan

[22] Filed: Feb. 17, 1976

[21] Appl. No.: 658,720

Related U.S. Application Data

[63] Continuation-in-part of Ser. No. 355,199, April 27, 1973, abandoned.

[52] U.S. Cl. .............................. 252/520; 106/73.31; 264/104; 252/62.3 BT
[51] Int. Cl.² .......................................... H01B 1/08
[58] Field of Search ...................... 252/520, 62.3 BT; 106/73.31; 264/104

[56] References Cited

UNITED STATES PATENTS 3,426,249  2/1969  Smyth ................................ 317/230
3,586,642  6/1971  Matsuo et al. ..................... 252/520

OTHER PUBLICATIONS

Chemical Abstracts 81, 178859x, "Barium Titanate Semiconductive Ceramic."

*Primary Examiner*—Edward A. Miller
*Assistant Examiner*—E. Suzanne Parr
*Attorney, Agent, or Firm*—Staas & Halsey

[57] ABSTRACT

Semiconducting ceramics are produced by firing a semiconducting composition of the barium titanate type containing vanadium oxide in the amount of 0.001 to 0.5 wt%. A change in the specific resistance over the range of the temperature at which the positive temperature coefficient characteristic of resistivity (PTCR) is exhibited can be increased by as much as $10^5$ times and the specific resistance value at room temperature can be controlled at a desired value. By further adding silicon dioxide to the above composition in the amount of 0.05 to 1.5 wt% the above effects can be enhanced, especially the specific resistance at ambient temperature.

5 Claims, 13 Drawing Figures

SEMICONDUCTING CERAMICS CONTAINING VANADIUM OXIDE

This application is a continuation-in-part of copending application Ser. No. 355,199, filed Apr. 27, 1973, now abandoned.

BACKGROUND OF THE INVENTION

1. Field of the Invention

This invention relates to semiconducting ceramics of barium titanate ($BaTiO_3$) systems.

2. Description of the Prior Art

It is well-known in the art that semiconducting ceramics of barium titanate systems are produced by adding a barium titanate composition ($BaTiO_3$) with at least one of rare earth elements or antimony (Sb), bismuth (Bi), niobium (Nb) and tantalum (Ta) as an activator for making the composition semiconductive and that the semiconducting ceramics of the barium titanate sintered family thus produced are employed as various electronic elements such, for example, as positive temperature coefficient characteristic of resistivity (PTCR) thermistors and the like, for utilization of their specific resistance-temperature coefficient characteristic of resistivity. In this case, it is often required that a change in the specific resistance with temperature represents a high gradient of a temperature at which the positive temperature coefficient characteristic of resistivity is exhibited and that the specific resistance at room temperature is controlled at a desired value. To comply with the requirements, it is the practice in the art to selectively alter firing conditions such as firing temperature, firing time, firing atmosphere and so on in the ceramics manufacturing process or add a small amount of iron (Fe), manganese (Mn) or other element to the semiconducting ceramics composition, thereby providing ceramics having specific resistance value at room temperature which is controllable and whose specific resistance undergoes a rapid and large change over the range of the temperature at which the positive temperature coefficient characteristic of resistivity is exhibited.

However, changing the firing conditions is undesirable since it is difficult to simultaneously control the specific resistance value and the range of its change with temperature as desired. In addition, it would require complex operations and controls to perform the process of mass production of the semiconducting ceramics. Further, the addition of a small amount of iron (Fe), manganese (Mn) or like element involves many difficulties in the manufacture of the semiconducting ceramics for the following reasons. Namely, a permissible range for the amount of such element added, for example, iron, is as narrow as 0.01 percent by weight relative to barium titanate, and the range for manganese is also 0.05 percent by weight at maximum. In addition, the specific resistance of the semiconducting ceramics is extremely susceptible to the influence of Fe or Mn, so that the amount of these elements added must be strictly controlled to obtain a desired specific resistance value and a desired change in the specific resistance with temperature.

SUMMARY OF THE INVENTION

This invention provides semiconducting ceramics of the barium titanate type such that the specific resistance at room temperature can be easily controlled at a desired value and that the total change in the specific resistance over the range of the temperature, at which the positive temperature coefficient characteristic of resistivity is exhibited, may be controlled.

The range of change of specific resistivity M is determined by the ratio of $\rho max/\rho min$, where $\rho max$ is the maximum specific resistivity exhibited by a material and $\rho min$ is the minimum specific resistivity which occurs where the PTC is exhibited. In the present invention, the additive element vanadium (V) has been found to increase M by as much as 1.5 to 140 times the range of change of resistivity Mo exhibited by the same materials without the additive. M has also been shown in the following examples 1, 6, 7, and 8 to have a value of up to $10^5$.

This invention provides semiconducting ceramics which are additionally characterized by the absolute value of the rate constant B between $T_p$ and $T_N$ being increased by as much as 1.2 to 4.7 times the rate constant of the same materials without the additive element.

The B constant is defined by the following relationship:

$$R = R_a \exp(B (1/T - 1/Ta) ),$$

where R is the d.c. resistance under active conditions, T is the absolute temperature of the material under active conditions, Ra is the zero power d.c. resistance at ambient temperature Ta. The resistance Ra is measured by applying power so small that there is negligible self heating. Therefore, if the $|B|$ is made larger the rate of change in the specific resistance versus temperature is also increased.

An additive element has been discovered having a wide permissible range of its amount added, overcoming the severe limitation imposed on the amount of the element added and overcoming the problems encountered in the addition of iron, manganese or the like. This invention is characterized by adding vanadium (V) to the barium titanate semiconducting ceramic compositions in the ratio of 0.001 to 0.5 percent by weight with respect to the latter before firing. The (V) is added to the following examples in varying amounts with a valence of +5. However, the vanadium becomes tetravalent or less after firing and is measurable under the following methods:

a. Measurement of specific resistance.
b. ESR (EPR) method.

The ESR (Election Spin Resonance) and EPR (Electron Paramagnetic Resonance) methods are outlined in the publication *Solid State Physics*, Supplement 2, by Low, "Paramagnetic Resonance in Solids", pgs. 1–7 Academic Press, 1960.

Further, this invention is characterized in that the semiconducting ceramics composition of the barium titanate series is added with 0.001 to 0.5 percent by weight of vanadium before firing.

Further, this invention is characterized in that the semiconducting ceramics composition of the barium titanate sintered family is added with 0.001 to 0.5 percent by weight of vanadium having a +5 valence and 0.05 to 1.5 percent by weight of silicon dioixde before firing, wherein the Vanadium becomes tetravalent or less, after firing.

This invention is effective for semiconducting $BaTiO_3$ ceramic compositions having respectively contained therein a rare earth element, antimony (Sb), bismuth (Bi), niobium (Nb) or tantalum (Ta) as an activator for making the compositions semiconductive.

This invention is also effective for barium titanate ceramic compositions in which contain at least one of titanate, zirconate and stannate; or titanium (Ti), silicon (Si), phosphorus (P), boron (B), aluminum (Al), iron (Fe) and manganese (Mn) may be added for the purpose of changing the specific resistance value at room temperature.

DESCRIPTION OF THE PREFERRED EMBODIMENTS

In the following preferred embodiments of this invention the semiconducting material of the barium titanate series employs, as an activator for making the barium titanate composition semiconductive, any one of yttrium (Y), neodymium (Nd) and antimony (Sb) which are selected from the group consisting of rare earth elements, antimony (Sb), bismuth (Bi), niobium (Nb) and tantalum (Ta). The specific resistancetemperature characteristics obtained in the case of vanadium (V) being added to the semiconducting material containing the above activators will be described with regard to the Examples 1 to 3. Further, the specific resistance-temperature characteristics, obtained in the cases of strontium (Sr) being added to the semiconductor materials containing yttrium (Y) and vanadium (V) for the purpose of shifting the Curie point, will be described in connection with the Examples of 4 and 5. In the Example 1, silicon dioxide ($SiO_2$) is used in addition to yttrium (Y) and vanadium (V). It is well-known that silicon dioxide can be added for lowering the temperature at which the barium titanate composition is made semiconductive. It has been found that silicon dioxide is very effective for suppressing a rapid change in the specific resistance of the semiconductor of the barium titanate series at room temperature to control it at a desired value with accuracy and with ease. The effect of addition of the silicon oxide will be described in detail in connection with the Example 6 and those following it. Hereinafter, all units are given in parts by weight unless otherwise stated. The amount of vanadium oxide is expressed as weight percent V, based on parts vanadium per 100 parts of the barium titanate composition. Silicon dioxide is likewise expressed as weight percent, based on 100 parts of the $BaTiO_3$ ceramic composition.

EXAMPLE 1

$Ba_{0.996}$ $Y_{0.004}$ $TiO_3$ + 0.3 weight% of $SiO2$ + x weight% of V

Barium carbonate ($BaCO_3$), yttrium oxide ($Y_2O_3$) and titanium oxide ($TiO_2$) were sampled in a Ba:Y:Ti atomic ratio of 0.996:0.004:1. Specimens of the mixture were prepared. Vanadium pentoxide ($V_2O_5$) was added to the specimens in the amount of 0, 0.001, 0.010, 0.110, 0.280 and 0.500 weight percent (wt%) vanadium (V) based on the titanate composition. Silicon oxide ($SiO_2$) was added to the mixtures in the amount of 0.3 percent by weight, based on titanate. These mixtures were calcined at 1150° C for 2 hours, resulting in the $V_2O_5$ to be converted to $VO_2$. The calcined mixtures were then pulverized, moulded into discs, and further fired at 1350° C for 2 hours.

Figure 1:
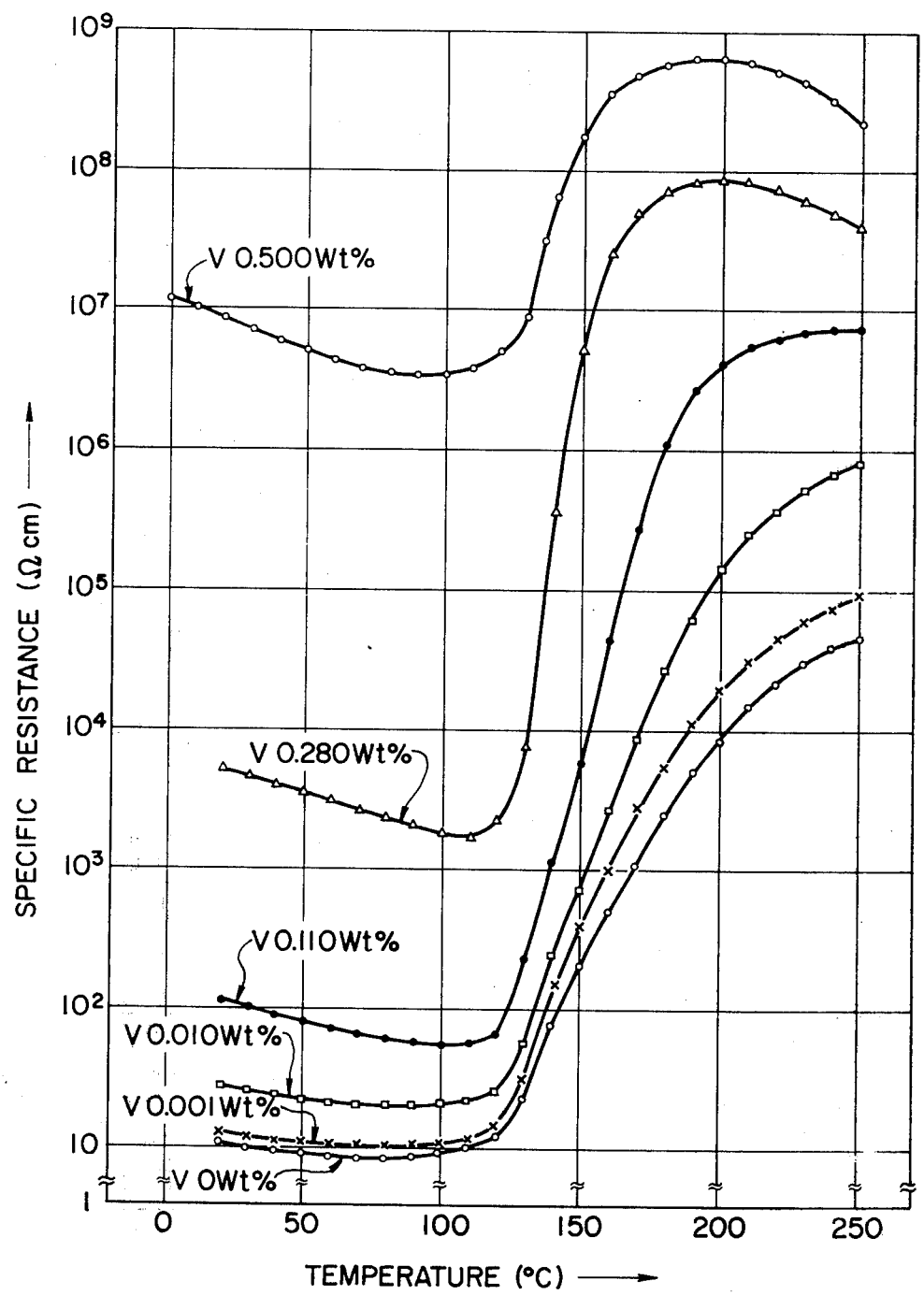
FIGS. 1 to 5, inclusive, are graphs showing the specific resistance-temperature characteristics of examples of this invention in which vanadium is added to semiconducting materials of the barium titanate systems, in comparison with those in the cases of no vanadium being added to the semiconducting materials.

The specific resistance-temperature characteristics of these ceramic discs, which were measured with ohmic electrodes, for example, In-Ga electrodes mounted on both sides of the discs, are shown in the Table 1 and in FIG. 1.

Table 1

| Amount X of vanadium (V) added (weight %) | Specific resistance Ωcm | | | |
|---|---|---|---|---|
| | 25° C | 100° C | 150° C | 200° C |
| 0 | $1.02 \times 10$ | 9.70 | $2.08 \times 10^2$ | $8.82 \times 10^3$ |
| 0.001 | $1.25 \times 10$ | $1.13 \times 10$ | $4.30 \times 10^2$ | $1.95 \times 10^4$ |
| 0.010 | $2.56 \times 10$ | $2.10 \times 10$ | $7.30 \times 10^2$ | $1.40 \times 10^5$ |
| 0.110 | $1.02 \times 10^2$ | $6.05 \times 10$ | $6.85 \times 10^3$ | $4.48 \times 10^6$ |
| 0.280 | $4.66 \times 10^3$ | $1.85 \times 10^3$ | $5.58 \times 10^6$ | $9.25 \times 10^7$ |
| 0.500 | $8.30 \times 10^6$ | $3.50 \times 10^6$ | $1.68 \times 10^8$ | $7.10 \times 10^8$ |

FIG. 1 clearly shows the effect produced by the addition of vanadium, as compared with the characteristic in the case of no vanadium being added. The silicon oxide was added to lower the temperature for making the barium titanate composition semiconductive and, further, control the specific resistance value at room temperature. The effect of the addition of vanadium could be recognized even by adding at least one of titanium (Ti), silicon (Si), phosphorus (P), boron (B), aluminum (Al), iron (Fe) and manganese (Mn) other than silicon oxide.

FIG. 1 measurements supply information for calculating the value of M and the factor of increased range of change of specific resistance for each specimen M/Mo, where Mo is the range of change of specific resistance for the material with 0% (V) added.

For example, specimen 5 with 0.280 wt% of (V) added exhibits a $\rho$min of approximately $1.75 \times 10^3$ at a Tp of approximately 115° C and a $\rho$max of approximately $9.5 \times 10^7$ at a Tn of approximately 200° C. M = $\rho$max/$\rho$min = $5.4 \times 10^4$.

Table 1a

| Amount x of Vanadium (V) added | M = ρmax/ρmin | \|B\| | M/Mo | \|B\|/\|Bo\| |
|---|---|---|---|---|
| 0 | Mo = $1.6 \times 10^4$ | Bo = $1.8 \times 10^4$ | | |
| 0.001 | $2.5 \times 10^4$ | $2.3 \times 10^4$ | 1.6 | 1.3 |
| 0.010 | $6.0 \times 10^4$ | $2.3 \times 10^4$ | 3.8 | 1.3 |
| 0.110 | $1.3 \times 10^5$ | $3.0 \times 10^4$ | 8.1 | 1.7 |

Table 1a-continued

| Amount x of Vanadium (V) added | M = ρmax/ρmin | \|B\| | M/Mo | \|B\|/\|Bo\| |
|---|---|---|---|---|
| 0.280 | $5.4 \times 10^4$ | $5.6 \times 10^4$ | 3.4 | 3.1 |
| 0.500 | $2.0 \times 10^2$ | $2.5 \times 10^4$ | $1.3 \times 10^{-2}$ | 1.1 |

Table 1a tabulates the relative values of M and |B| derived from the aforesaid measurements. Table 1a also indicates the relative increases affected by the addition of specific amounts of the additive (V) in Example 1.

EXAMPLE 2

$Ba_{0.998} Nd_{0.002} TiO_3 + x$ weight % of V

Barium carbonate ($BaCO_3$), neodymium oxide ($Nd_2O_3$) and titanium oxide ($TiO_2$) were sampled in the Ba:Bd:Ti atomic ratio of 0.998:0 0.002:1. Vanadium pentoxide ($V_2O_5$) was mixed in the specimens in the amount of 0, 0.003, 0.110 and 0.300 percent.

The mixtures were calcined at 1150° C for 2 hours, wherein the $V_2O_5$ was converted completely into $VO_2$. The calcined mixtures were then pulverized and moulded into discs, which were further fired at 1400° C for 2 hours. The specific resistance-temperature characteristics of these ceramic discs, measured with ohmic electrodes mounted on both sides of the discs, are shown in the Table 2 and in FIG. 2.

Table 2

| Amount X of vanadium (V) added (weight %) | Specific resistance Ωcm | | | |
|---|---|---|---|---|
| | 25° C | 100° C | 150° C | 200° C |
| 0 | $2.58 \times 10$ | $2.35 \times 10$ | $1.64 \times 10^3$ | $1.18 \times 10^4$ |
| 0.003 | $3.70 \times 10$ | $2.80 \times 10$ | $4.45 \times 10^3$ | $4.80 \times 10^4$ |
| 0.110 | $1.29 \times 10^2$ | $7.90 \times 10$ | $1.32 \times 10^5$ | $2.22 \times 10^6$ |
| 0.300 | $9.80 \times 10^3$ | $3.35 \times 10^3$ | $8.40 \times 10^7$ | $6.60 \times 10^7$ |

Figure 2:
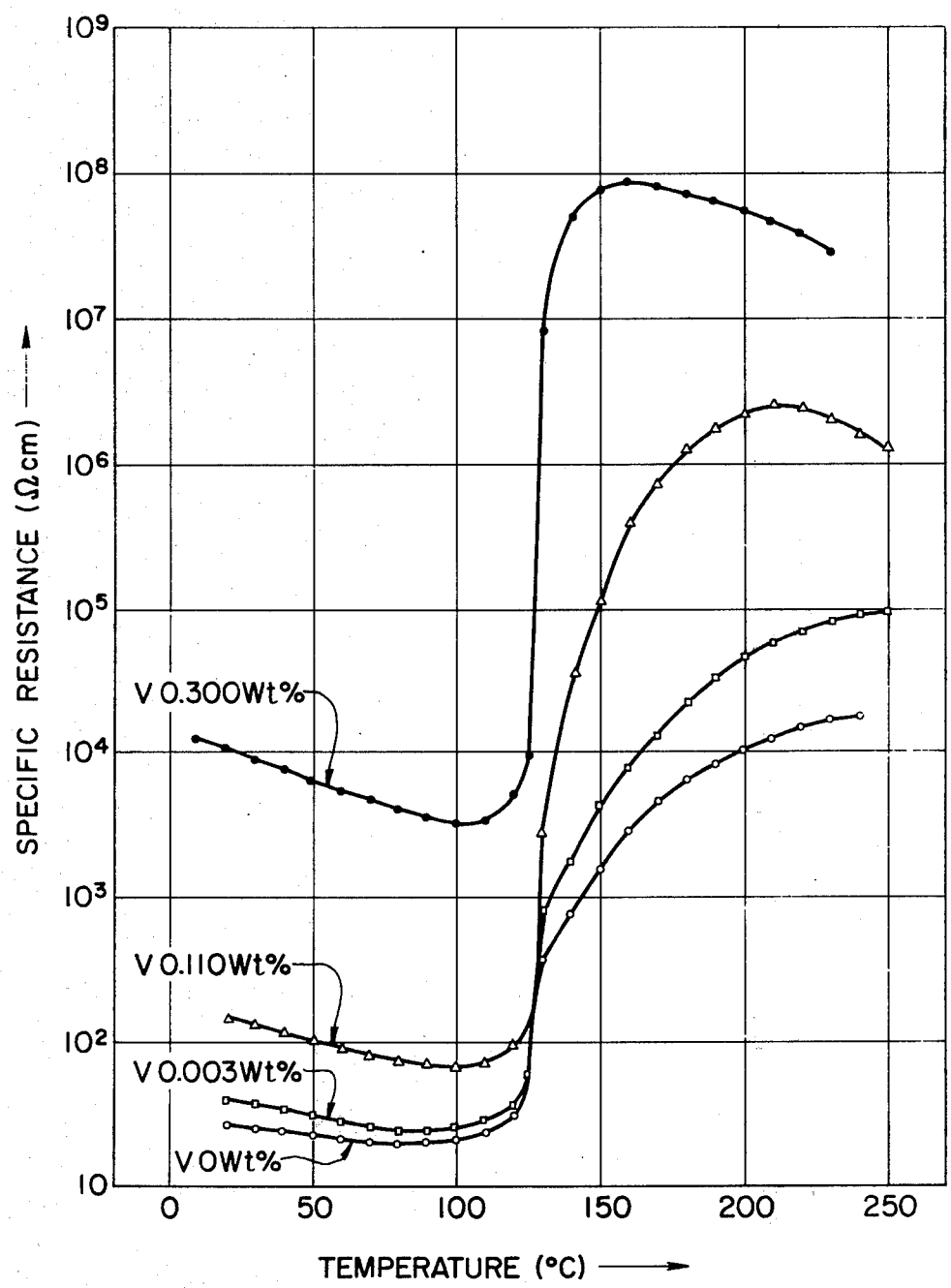

FIG. 2 shows the effect similarly produced by the addition of vanadium in the case of using neodymium (Nd) as an activator for making the barium titanate composition semiconductive.

Even if some other rare earth element is used as the activator, the same results can be obtained.

Table 2a

| Amount x of Vanadium (V) added | M = ρmax/ρmin | $\{^K_B\}$ | M/Mo | \|B\|/\|Bo\| |
|---|---|---|---|---|
| 0 | Mo = $8.7 \times 10^2$ | \|Bo\| = $4.7 \times 10^4$ | | |
| 0.003 | $3.6 \times 10^3$ | $7.5 \times 10^4$ | 4.1 | 1.6 |
| 0.110 | $3.0 \times 10^4$ | $1.0 \times 10^5$ | 34 | 2.1 |
| 0.300 | $2.7 \times 10^4$ | $2.2 \times 10^5$ | 31 | 4.7 |

Table 2a shows the relative increase effected by the addition of specific amounts of the additive (V) in Example 2.

EXAMPLE 3

$Ba_{0.998} Sb_{0.002} TiO_3 + X$ weight% of V

Barium carbonate ($BaCO_3$), antimony oxide ($Sb_2O_4$) and titanium oxide ($TiO_2$) were sampled in a Ba:Sb:Ti atomic ratio of 0.998:0.002:1. Vanadium pentoixde ($V_2O_5$) was mixed in the specimens in the amount of 0, 0.003, 0.110 and 0.300 wt%. The mixtures were calcined at 1150° C for 2 hours, wherein the $V_2O_5$ was converted completely into $VO_2$. The calcined mixtures were then moulded into discs, and further fired at 1400° C for 2 hours. The specific resistancetemperature characteristics of these ceramic discs, measured with ohmic electrodes mounted on both sides of the discs, are shown in the Table 3 and in FIG. 3.

Figure 3:
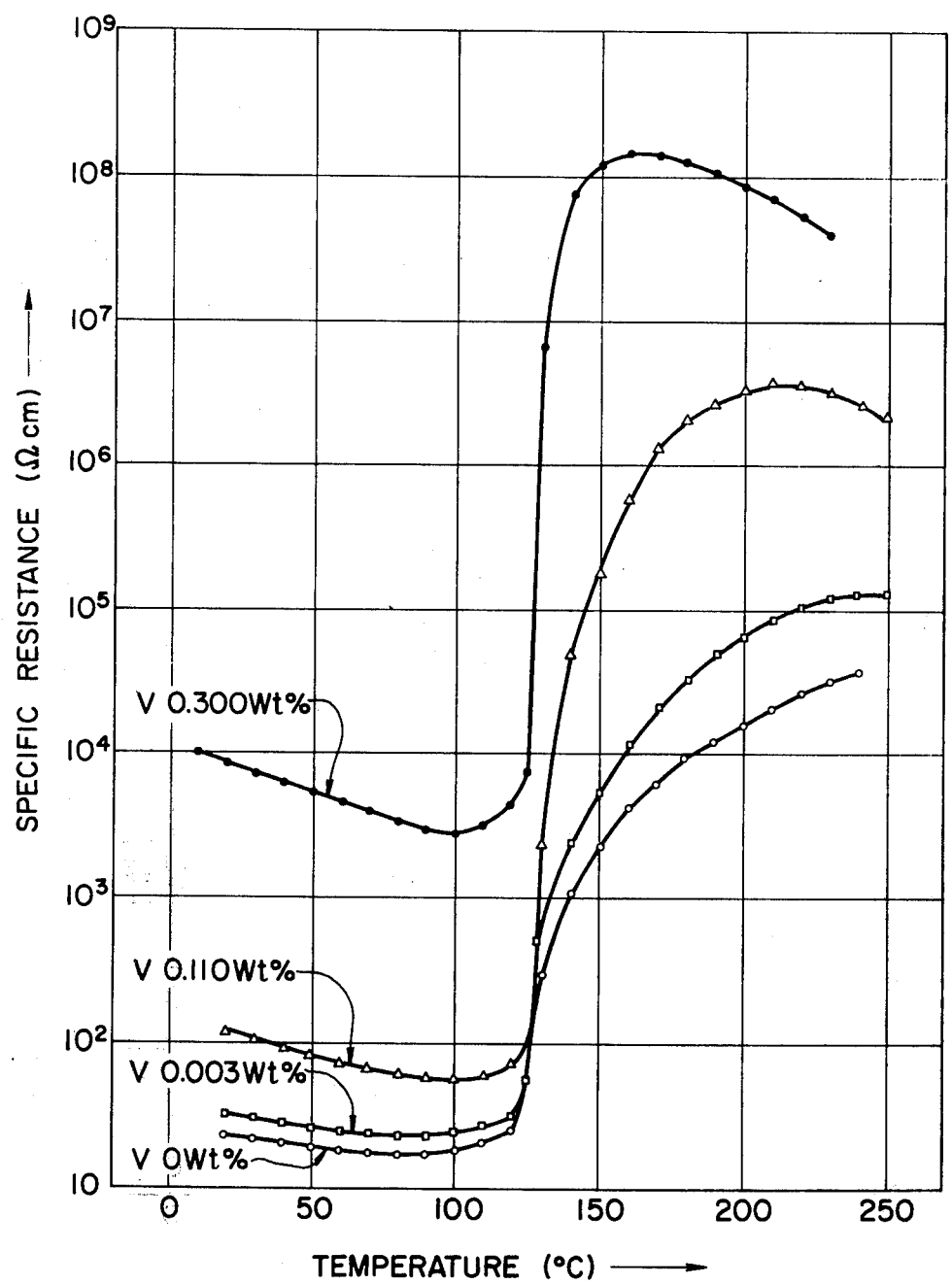

FIG. 3 shows that the effect produced by the addition of vanadium is also obtained in the case of employing antimony as the activator for rendering the barium titanate composition semiconductive.

Table 3

| Amount X of vanadium (V) added (weight %) | Specific resistance Ωcm | | | |
|---|---|---|---|---|
| | 25° C | 100° C | 150° C | 200° C |
| 0 | $2.16 \times 10$ | $1.93 \times 10$ | $2.35 \times 10^3$ | $1.77 \times 10^4$ |
| 0.003 | $3.10 \times 10$ | $2.34 \times 10$ | $6.40 \times 10^3$ | $7.50 \times 10^4$ |
| 0.110 | $1.08 \times 10^2$ | $6.40 \times 10$ | $1.90 \times 10^5$ | $3.50 \times 10^6$ |
| 0.300 | $8.20 \times 10^3$ | $2.90 \times 10^3$ | $1.26 ;33\ 10^8$ | $9.60 \times 10^7$ |

Using bismuth (Bi), niobium (Nb) or tantalum (Ta) as the activator elements, a similar effect is obtained by the addition of vanadium.

Table 3a

| Amount x of Vanadium (V) added | M = ρmax/ρmin | $\{^K_B\}$ | M/Mo | \|B\|/\|Bo\| |
|---|---|---|---|---|
| 0 | Mo = $1.6 \times 10^3$ | \|Bo\| = $5.4 \times 10^4$ | | |
| 0.003 | $6.1 \times 10^3$ | $7.6 \times 10^4$ | 3.8 | 1.4 |
| 0.110 | $5.5 \times 10^4$ | $9.7 \times 10^4$ | 3.4 | 1.8 |
| 0.300 | $5.0 \times 10^4$ | $2.2 \times 10^5$ | 1.6 | 4.1 |

Table 3a shows the relative increase effected by the addition of specific amounts of the additive (V) in Example 3.

EXAMPLE 4

$Ba_{0.796}Sr_{0.200}Y_{0.004}TiO_3 + x$ weight % of V

Barium carbonate ($BaCO_3$), strontium carbonate ($SrCO_3$), yttrium oxide ($Y_2O_3$) and titanium oxide ($TiO_2$) were sampled in a Ba:Sr:Y:Ta atomic ratio of 0.796:0.200:0.004:1. Vanadium pentoxide ($V_2O_5$) was added to specimens in the amount of 0, 0.110 and 0.220 wt%. The mixtures were calcined at 1150° C for 2 hours, wherein the $V_2O_5$ was completely converted to $VO_2$. Then the calcined mixtures were pulverized, moulded into discs, and fired at 1400° C for 2 hours. The specific resistance-temperature characteristics of these discs, which were measured with ohmic electrodes mounted on both sides of he discs, are shown in the Table 4 and in FIG. 4.

Table 4

| Amount X of vanadium (V) added (weight %) | Specific resistance Ωcm | | | |
|---|---|---|---|---|
| | 25° C | 100° C | 150° C | 200° C |
| 0 | 1.53×10 | 3.55×10² | 4.38×10³ | 2.12×10⁴ |
| 0.110 | 1.05×10² | 1.75×10⁴ | 1.45×10⁶ | 7.60×10⁶ |
| 0.220 | 4.90×10³ | 1.90×10⁷ | 3.10×10⁸ | 2.42×10⁸ |

Figure 4:
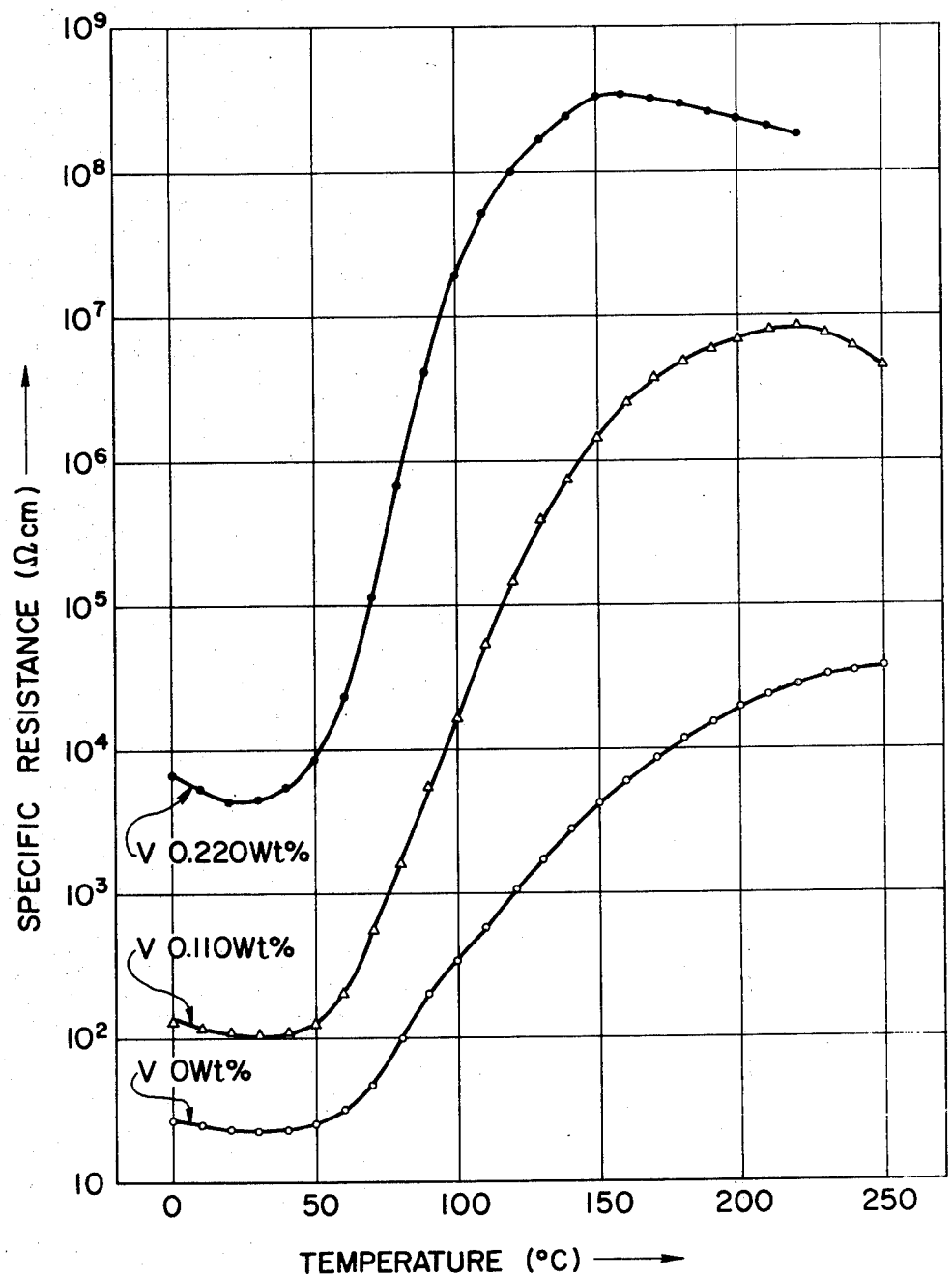

FIG. 4 shows that the effect resulting from the addition of vanadium is obtained even in the case where the temperature at which the positive temperature coefficient characteristic of resistivity is exhibited as shifted by using strontium (Sr) serving to shift the Curie point in additon to yttrium (Y) serving as the activator for making the barium titanate composition semiconductive. This is further confirmed by the following Example.

Table 4a

| Amount x of vanadium (V) added | M = ρmax/ρmin | \|B\| (K) | M/Mo | \|B\|/\|Bo\| |
|---|---|---|---|---|
| 0 | Mo = 1.5 × 10³ | \|Bo\| = 1.2 × 10³ | | |
| 0.110 | 7.8 × 10⁴ | 1.4 × 10⁴ | 52 | 1.7 |
| 0.220 | 6.4 × 10⁴ | 2.3 × 10⁴ | 42 | 2.8 |

Table 4a shows the relative increase effected by the addition of specific amounts of the additive (V) in Example 4.

EXAMPLE 5

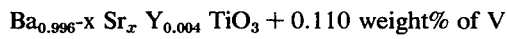

$Ba_{0.996-x} Sr_x Y_{0.004} TiO_3$ + 0.110 weight% of V

Barium carbonate ($BaCO_3$), strontium carbonate ($SrCO_3$), yttrium oxide ($Y_2O_3$) and titanium oxide ($TiO_2$) were sampled in the atomic ratios given in the Table 5 for barium (Ba), strontium (Sr), yttrium (Y) and titanium (Ti), and specimens of such composition were prepared. Vanadium pentoxide ($V_2O_5$) was added to the specimens in the amount of 0.110 wt%.

Table 5

| Specimen Number | Atomic Ratio | | | |
|---|---|---|---|---|
| | Ba | Sr | Y | Ti |
| 1 | 0.996 | 0 | 0.004 | 1 |
| 2 | 0.896 | 0.100 | 0.004 | 1 |
| 3 | 0.796 | 0.200 | 0.004 | 1 |

Figure 5:
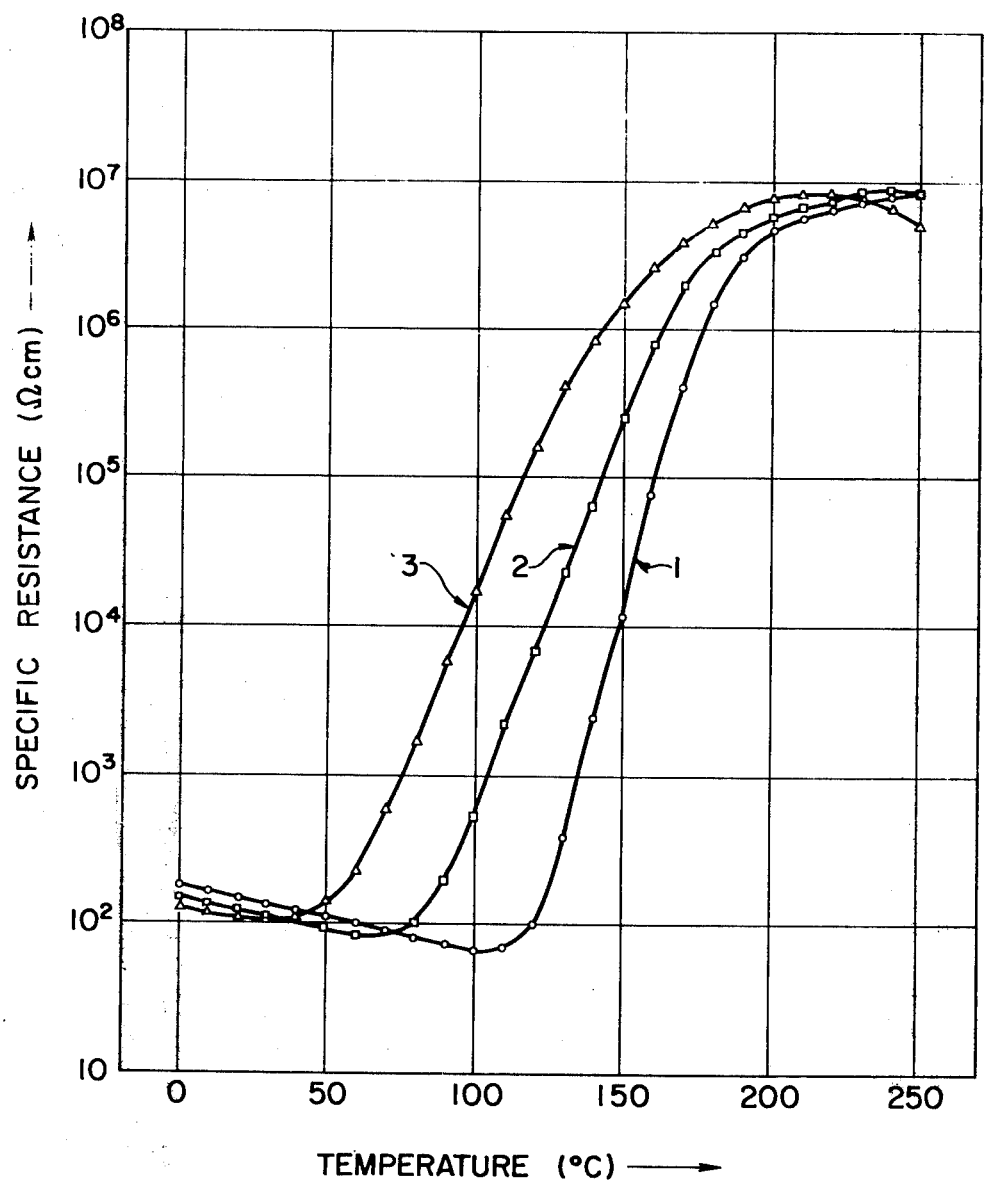

The mixtures were calcined at 1150° C for two hours, wherein the $V_2O_5$ was completely converted to $VO_2$. The calcined mixtures were then pulverized, moulded into discs, and fired at 1400° C for 2 hours. The specific resistance-temperature characteristics of these ceramic discs, which were measured with ohmic electrodes mounted on both sides of the discs, are shown in the Table 6 and in FIG. 5.

Table 6

| Specimen Number | Specific resistance Ωcm | | | |
|---|---|---|---|---|
| | 25° C | 100° C | 150° C | 200° C |
| 1 | 1.38 × 10² | 7.35 × 10 | 1.25 × 10⁴ | 4.80 × 10⁶ |
| 2 | 1.22 × 10² | 6.82 × 10² | 2.60 × 10⁵ | 6.00 × 10⁶ |
| 3 | 1.05 × 10² | 1.75 × 10⁴ | 1.45 × 10⁶ | 7.60 × 10⁶ |

In the Example 5, the amount of vanadium (V) was held constant while the amount of strontium titanate ($SrTiO_3$) was varied. It will be seen from the measured values that the temperature at which the positive temperature coefficient characteristic of resistivity is exhibited can be shifted at will while maintaining the effect produced by the addition of vanadium.

Further, even by partial substitution of the barium titanate with lead titanate ($PbTiO_3$) or other titanate, zerconate or stannate, the temperature at which the positive temperature coefficient characteristic of resistivity is exhibited can be freely shifted while retaining the effect resulting from the addition of vanadium.

As has been described in connection with the foregoing Examples, by adding vanadium to semiconducting ceramics of the barium titanate type the change in specific resistance can be effected within a wide range of vanadium content. The specific resistance change over the range of temperature at which the positive temperature coefficient characteristic of resistivity is exhibited from the minimum temperature $T_p$ (ρmin at $T_P$) to the maximum temperature $T_n$ corresponding to the maximum value of specific resistance (ρmax at $T_N$) can be increased up to a value of about 10⁵ and moreover can be increased in a range of from 1.2 to 4.7 times that of the material with no vanadium added.

As will be apparent from the curves depicted in the figures, another feature of this invention is that their temperature zones, including room temperature below the PTCR temperature, exhibit a linear negative temperature coefficient. Accordingly, it is possible to provide the ceramic element of this invention with a temperature compensation effect by using it in combination with a part having a positive temperature coefficient characteristic of resistivity. Hence, coupled with the aforesaid easy control of the specific resistance value at room temperature, the ceramic element according to this invention can be expected to have useful applications.

Further, vanadium (V) need not always be added in the form of vanadium pentoxide ($V_2O_5$) but may be added in other oxidized forms, such as ammonium vanadate ($NH_4VO_3$) or the like. However, in each case the vanadium has a valence of +5 when added, but becomes tetravalent or less during the sintering process and remains so in the final product.

In the present invention, where the amount of vanadium added is less than 0.001 percent by weight, the specific resistance change over the range of temperature at which the positive temperature coefficient characteristic of resistivity is exhibited is substantially the same as that in the case where no vanadium is added, as shown in the Table 1 and in FIG. 1. Where more than 0.5 percent by weight of vanadium is added, the specific resistance at room temperature exceeds $10^6 \Omega$ cm and the specific resistance change with temperature decreases markedly as shown in the Table 1 and in FIG. 1. According to our experiments, such phenomena similarly occurred in other semiconducting ceramics of the barium titanate systems or semiconducting ceramics including the additives. For the above reasons, in the present invention, the amount of vanadium added is limited within a range of 0.001 to 0.5 wt%.

With the present invention, the permissible range for the vanadium additive is large and the electrical characteristic undergoes a slight change within the range. Hence, this invention allows ease in mass production of semiconducting ceramics whose specific resistance greatly changes with temperature and in the provision of semiconducting ceramics of many kinds of electrical characteristics.

The following describes the specific resistance-temperature characteristic in the case where silicon dioxide ($SiO_2$) is further added to the above-described semiconductive material of the barium titanate systems added with vanadium and the effect thereby produced on the specific resistance at room temperature. Namely, the cases of using yttrium (Y) and dysprosium (Dy) as activators for making the barium titanate composition seniconductive will be described with regard to Examples 6 and 7 respectively and the case of adding strontium (Sr) in addition to dysprosium (Dy) for shifting the Curie point will be described in connection with Example 8. Example 9 shows the effect of silicon oxide ($SiO_2$) on a change in the specific resistance value at room temperature which is caused by a change in the amount of vanadium added and Example 10 shows the effect produced by addition of manganese (Mn).

EXAMPLE 6

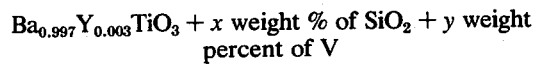

$Ba_{0.997}Y_{0.003}TiO_3 + x$ weight % of $SiO_2 + y$ weight percent of V

Barium carbonate ($BaCO_3$), yttrium oxide ($Y_2O_3$) and titanium oxide ($TiO_2$) were sampled in the atomic ratio of 0.997:0.003:1 in connection with barium (Ba), yttrium (Y) and titanium (Ti) and a plurality of specimens of such composition were made. Vanadium pentoxide ($V_2O_5$) was added to the specimens in the amount of 0, 0.05, 0.100 0.300 and 0.500 wt% V. Silicon dioxide ($SiO_2$) was added to the specimens in the amount of 0.6 percent by weight relative to the latter.

At the same time, a specimen having no silicon dioxide ($SiO_2$) added thereto was also prepared. These mixtures were calcined at 1150° C for 2 hours, wherein the $V_2O_5$ was completely converted to $VO_2$. The calcined mixtures were then pulverized, moulded into discs, and fired at 1350° C for 2 hours. The specimen having no silicon dioxide were fired at 1400° C for 2 hours.

Figure 6:
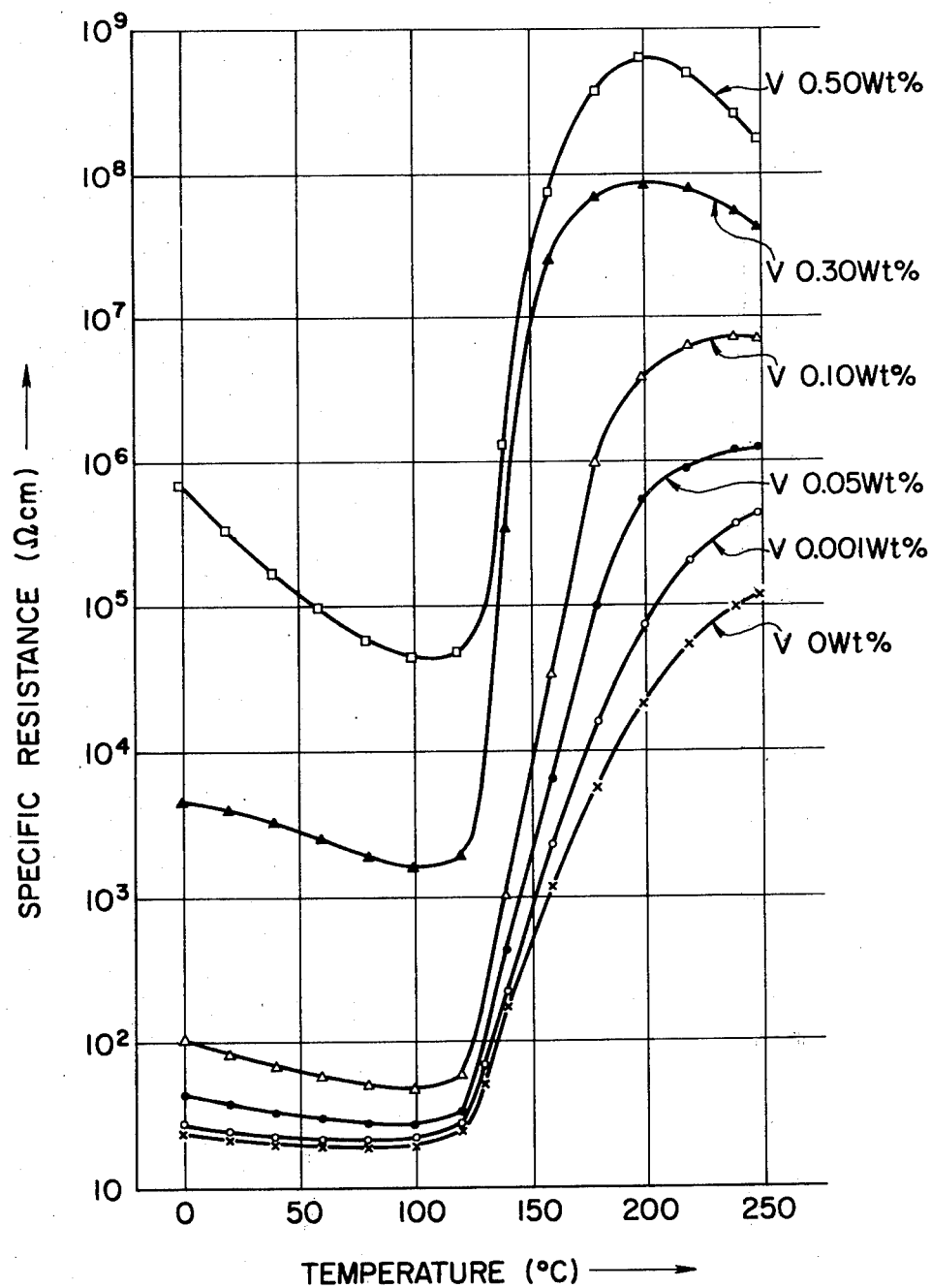
FIGS. 6, 8 to 10 and 12, are graphs showing the specific resistance-temperature characteristics of other examples of this invention in which vanadium and silicon dioxide are added to semiconducting materials of the barium titanate series, in comparison with those in the cases of neither vanadium nor silicon oxide being added to the semicondicting materials.
Figure 7:
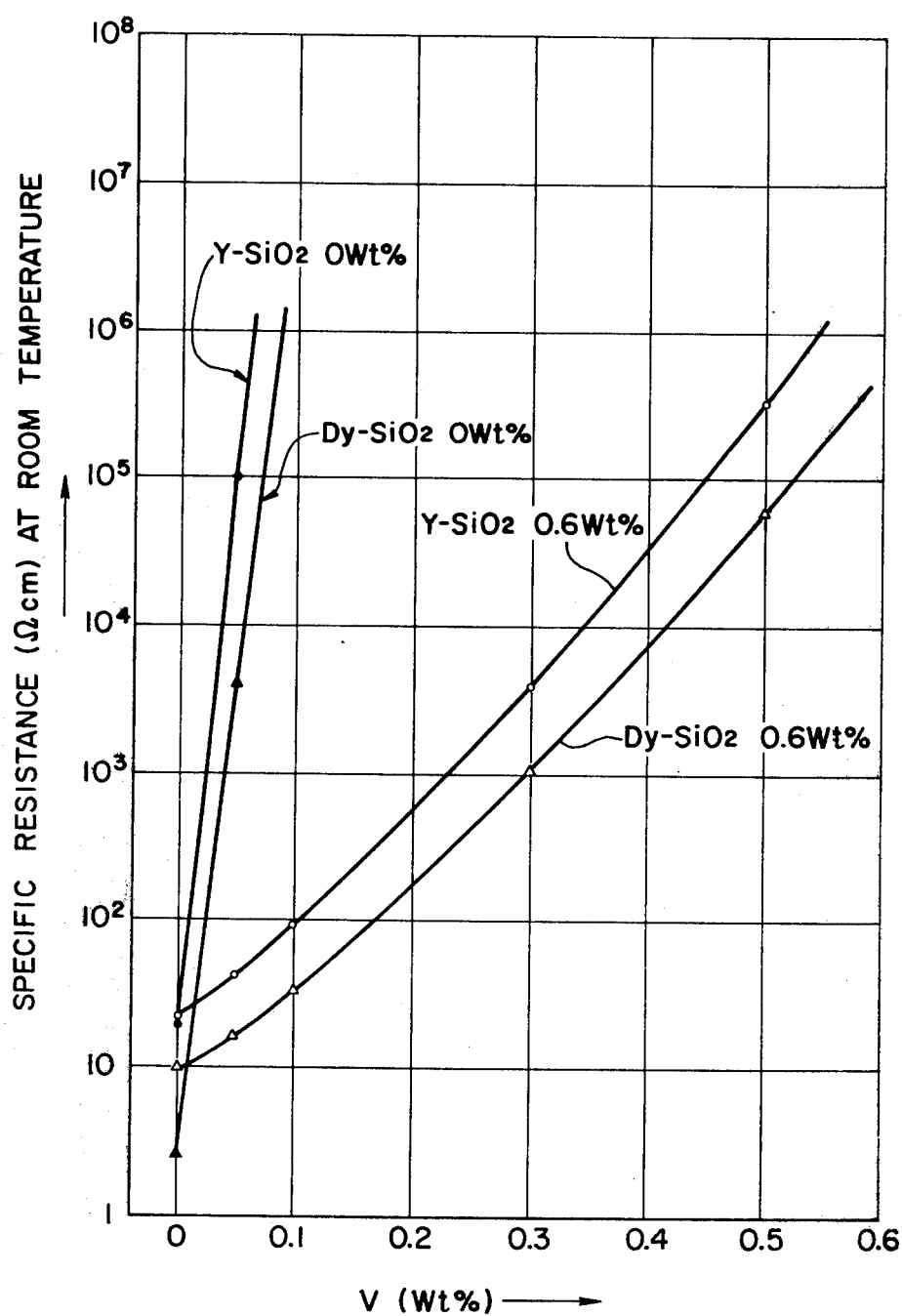
FIGS. 7, 11 and 13, are graphs showing the specific resistance characteristics at room temperature obtained in the cases of adding vanadium and silicon oxide to the semiconducting materials.
Figure 8:
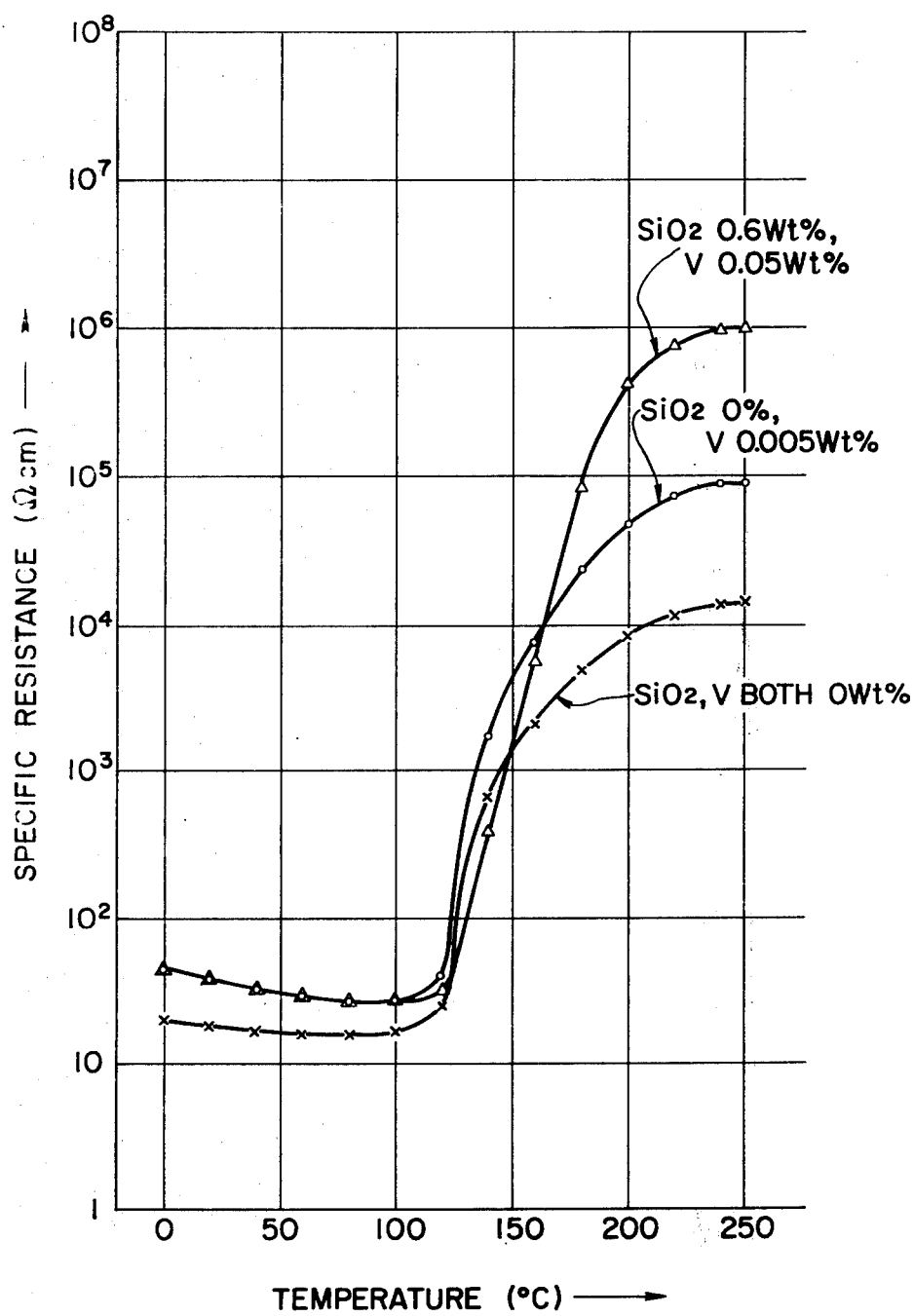

The specific resistance-temperature characteristics of these ceramic discs, which were measured with ohmic electrodes, for example, In-Ga electrodes mounted on both sides of the discs, are shown in the Table 7 and in FIGS. 6, 7 and 8.

Table 7

| Amount added (weight %) | | Specific resistance $\Omega$cm | | | |
|---|---|---|---|---|---|
| $SiO_2$ | V | 25° C | 100° C | 150° C | 200° C |
| 0.6 | 0 | $2.25 \times 10$ | $2.02 \times 10$ | $4.35 \times 10^2$ | $1.93 \times 10^4$ |
|  | 0.001 | $2.50 \times 10$ | $2.20 \times 10$ | $6.62 \times 10^2$ | $6.60 \times 10^4$ |
|  | 0.050 | $3.98 \times 10$ | $2.84 \times 10$ | $1.46 \times 10^3$ | $4.55 \times 10^5$ |
|  | 0.100 | $8.80 \times 10$ | $4.85 \times 10$ | $5.42 \times 10^3$ | $3.30 \times 10^6$ |
|  | 0.300 | $3.75 \times 10^3$ | $1.55 \times 10^3$ | $4.62 \times 10^6$ | $7.28 \times 10^7$ |
|  | 0.500 | $3.22 \times 10^5$ | $4.30 \times 10^4$ | $1.33 \times 10^7$ | $5.15 \times 10^8$ |
| 0 | 0 | $1.85 \times 10$ | $1.65 \times 10$ | $1.24 \times 10^3$ | $8.75 \times 10^3$ |
|  | 0.005 | $4.02 \times 10$ | $2.86 \times 10$ | $2.72 \times 10^3$ | $4.90 \times 10^4$ |
|  | 0.050 | $1.05 \times 10^5$ |  |  |  |

FIG. 6 illustrates the specific resistance-temperature characteristics of the specimens having added thereto yttrium (Y) as an activator for making the barium titanate composition semiconductive and further having added thereto silicon dioxide in the amount of 0.6 percent by weight relative to the specimens. In a certain range of 0.001 to 0.5 percent by weight of vanadium added, an increase in the amount of vanadium added causes an abrupt increase in the positive temperature coefficient characteristic of resistivity and this shows the effect produced by the addition of vanadium.

FIG. 7 illustrates the variations in the specific resistance at room temperature, which are caused by the increase in the amount of vanadium added, in connection with the case where yttrium (Y) and dyprosium (Dy) described later with regard to the Example 7 are added as activators for making the barium titanate composition semiconductive. It will appear from FIG. 7 that the change in the specific resistance at room temperature is very slight in the systems containing silicon oxide, as compared with that in the systems containing no silicon oxide. This shows how silicon dioxide is effective for controlling the specific resistance at room temperature at a desired value.

Table 7a

| Amount added | | | |B| | | |
|---|---|---|---|---|---|
| $SiO_2$ | V | $M = \rho max/\rho min$ | (K) | M/Mo | \|B\|/\|Bo\| |
|  | 0 | $Mo = 7.5 \times 10^3$ | \|Bo\| $= 1.9 \times 10^4$ |  |  |
|  | 0.001 | $2.2 \times 10^4$ | $2.0 \times 10^4$ | 2.9 | 1.1 |
| 0.6 | 0.050 | $4.1 \times 10^4$ | $2.4 \times 10^4$ | 5.5 | 1.3 |
|  | 0.100 | $1.2 \times 10^5$ | $3.0 \times 10^4$ | 16 | 1.6 |
|  | 0.300 | $5.0 \times 10^4$ | $5.8 \times 10^4$ | 6.7 | 3.1 |
|  | 0.500 | $1.3 \times 10^4$ | $4.6 \times 10^4$ | 1.7 | 2.4 |

Table 7b

| Amount added | | | |B| | | |
|---|---|---|---|---|---|
| $SiO_2$ | V | $M = \rho max/\rho min$ | (K) | M/Mo | \|B\|/\|Bo\| |
| 0 | 0 | $Mo = 9.3 \times 10^2$ | \|Bo\| $= 3.6 \times 10^4$ |  |  |
| 0 | 0.005 | $3.4 \times 10^3$ | $3.7 \times 10^4$ | 3.7 | 1.0 |
| 0.6 | 0.050 | $4.1 \times 10^4$ | $2.4 \times 10^4$ | 44 | $6.7 \times 10^{-1}$ |

Table 7a shows the relative increase effected by the addition of specific amounts of the additive (V) in Example 6 wherein $SiO_2$ is added in an amount of 0.6 wt% (see FIG. 6).

Table 7b shows the relation increase effected of specific amounts of the additive (V) in Example 6 wherein $SiO_2$ is not added (see FIG. 8).

FIG. 8 illustrates the specific resistance-temperature characteristics of the specimen containing 0.05 wt% V and 0.6 percent by weight of silicon dioxide together with a specimen containing 0.005 wt% V, but no silicon dioxide. It will be seen from FIG. 8 that in the systems containing both vanadium and silicon dioxide, the positive temperature coefficient characteristic of resistivity can be increased more than in the systems containing vanadium only. The specific resistance-temperature characteristic in the case of unmodified $BaTiO_3$ with neither vanadium nor silicon oxide is depicted for comparison.

It will be seen from the above that the addition of both vanadium and silicon dioxide to the titanate series containing yttrium (Y) as the activator for rendering the barium titanate composition semiconductive is very effective for increasing the positive temperature coefficient characteristic of resistivity and for obtaining a desired specific resistance value.

EXAMPLE 7

$Ba_{0.9975}Dy_{0.0025} TiO_3 + x$ weight % of $SiO_2 + y$ weight % of V

Barium carbonate ($BaCO_3$), dysprosium oxide ($Dy_2O_3$) and titanium oxide ($TiO_2$) were sampled in Ba:Dy:Ti atomic ratio of 0.9975:0.0025:1. Vanadium pentoxide ($V_2O_5$) was added to specimens in the amount of 0, 0.001, 0.05, 0.100, 0.300 and 0.500 wt% V. Then, silicon dioxide ($SiO_2$) was added to the specimens in the amount of 0.6 percent by weight relative to the latter. At the same time, a specimen without silicon dioxide ($SiO_2$) and (V) was also prepared. The mixtures were calcined at 1150° C for 2 hours, wherein the $V_2O_5$ was completely converted to $VO_2$. The calcined mixtures were then pulverized and moulded into discs, and fired at 1350° C for 2 hours. The specimen having no silicon dioxide added thereto was fired at 1400° C for 2 hours.

Figure 9:
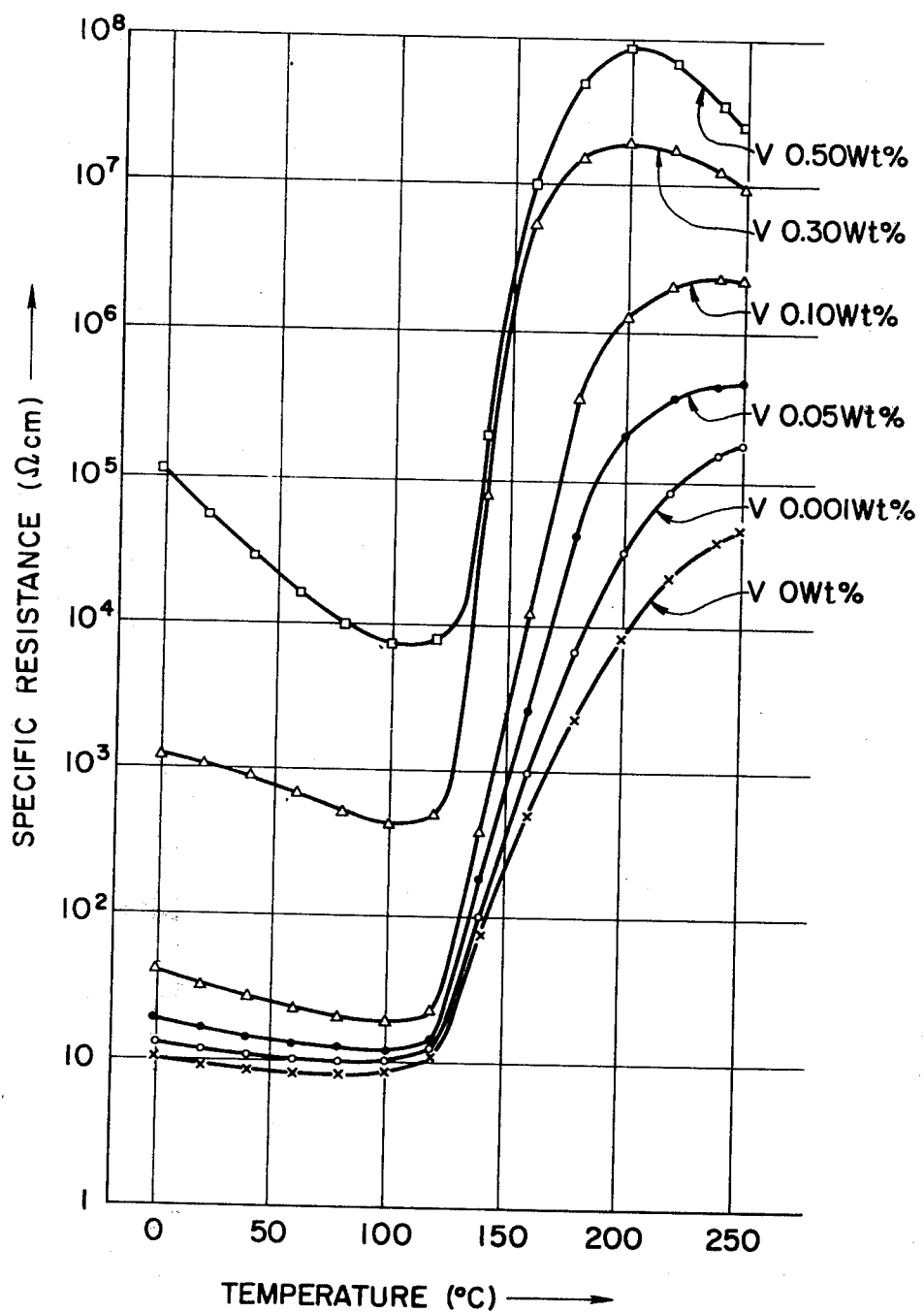
Figure 10:
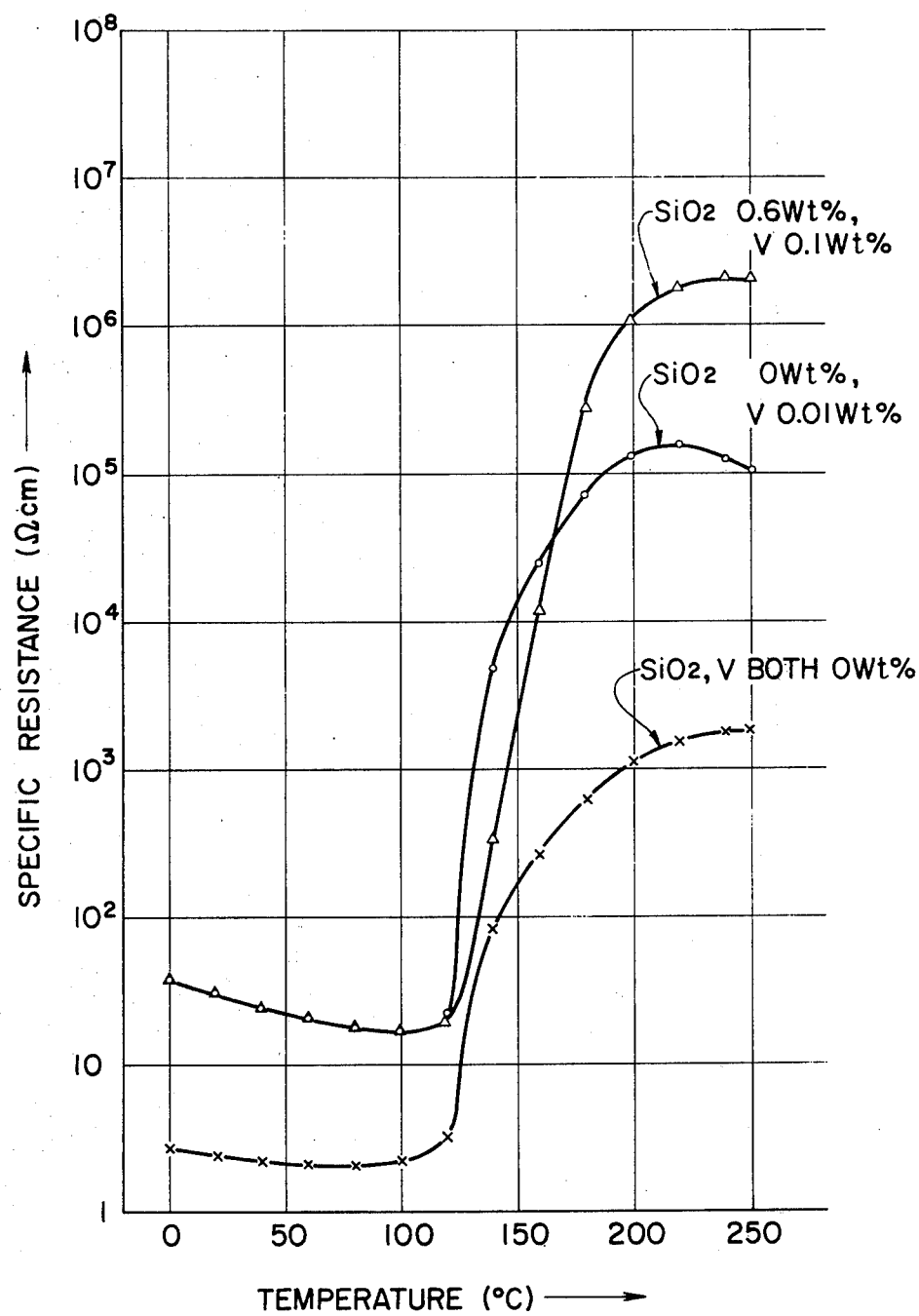

The specific resistance-temperature characteristics of these discs, which were measured with ohmic electrodes, for example, In-Ga electrodes mounted on both sides of the discs, are shown in the Table 8 and in FIGS. 7, 9 and 10.

Table 8

| Amount added (weight %) | | Specific resistance Ωcm | | | |
|---|---|---|---|---|---|
| $SiO_2$ | V | 25° C | 100° C | 150° C | 200° C |
| 0.6 | 0 | 9.98 | 8.32 | $1.95 \times 10^2$ | $8.14 \times 10^3$ |
| | 0.001 | $1.10 \times 10$ | 9.85 | $2.93 \times 10^2$ | $3.02 \times 10^4$ |
| | 0.050 | $1.72 \times 10$ | $1.14 \times 10$ | $6.25 \times 10^2$ | $2.02 \times 10^5$ |
| | 0.100 | $3.34 \times 10$ | $1.86 \times 10$ | $2.30 \times 10^3$ | $1.32 \times 10^6$ |
| | 0.300 | $1.15 \times 10^3$ | $4.02 \times 10^2$ | $1.36 \times 10^6$ | $1.98 \times 10^7$ |
| | 0.500 | $5.63 \times 10^4$ | $7.32 \times 10^3$ | $2.08 \times 10^6$ | $8.82 \times 10^7$ |
| 0 | 0 | 2.62 | 2.40 | $1.64 \times 10^2$ | $1.13 \times 10^3$ |
| 0 | 0.010 | $3.12 \times 10$ | $1.73 \times 10$ | $1.28 \times 10^4$ | $1.33 \times 10^5$ |
| 0 | 0.100 | $5.78 \times 10^4$ | | | |

FIG. 9 illustrates the specific resistance-temperature characteristics of the systems having added thereto dysprosium (Dy) as an activator for making them semiconductive and containing silicon dioxide in the ratio of 0.6 percent by weight relative to them. In a certain range of 0.001 to 0.5 wt% V an increase in the amount of vanadium added causes an abrupt increase in the positive temperature coefficient characteristic of resistivity and this is the effect due to the addition of vanadium.

Table 8a

| Amount added | | | |B| | | |
|---|---|---|---|---|---|
| $SiO_2$ | V | M = ρmax/ρmin | (K) | M/Mo | |B|/|Bo| |
| | 0 | Mo = $5.9 \times 10^3$ | |Bo| = $1.9 \times 10^4$ | | |
| | 0.001 | $1.9 \times 10^4$ | $2.0 \times 10^4$ | 3.2 | 1.1 |
| 0.6 | 0.050 | $3.9 \times 10^4$ | $2.3 \times 10^4$ | 6.6 | 1.2 |
| | 0.100 | $1.2 \times 10^5$ | $3.0 \times 10^4$ | 22 | 1.5 |
| | 0.300 | $4.5 \times 10^4$ | $6.1 \times 10^4$ | 7.6 | 3.2 |
| | 0.500 | $1.2 \times 10^4$ | $4.8 \times 10^4$ | 2.0 | 2.5 |

Table 8a shows the relative increase effected by the addition of specific amounts of the additive (V) in Example 7, wherein $SiO_2$ is added in an amount of 0.6 wt% and (Dy) is used as an activator (see FIG. 9).

FIG. 10 illustrates the specific resistance-temperature characteristics of a specimen containing 0.1 percent vanadium and 0.6 percent silicon oxide, and another specimen containing 0.01 wt% V only, both of which specimens are substantially equal to each other in the specific resistance at room temperature. A comparison of the illustrated characteristics shows that, in the systems containing both vanadium and silicon oxide, the positive temperature characteristic can be increased more than in the series containing only vanadium. The specific resistance-temperature characteristic in the case of neither vanadium nor silicon oxide being added is depicted for comparison purposes.

Table 8b

| Amount added | | | |B| | | |
|---|---|---|---|---|---|
| $SiO_2$ | V | M = ρmax/ρmin | (K) | M/Mo | |B|/|Bo| |
| 0 | 0 | Mo = $8.2 \times 10^2$ | |Bo| = $3.6 \times 10^4$ | | |
| 0 | 0.01 | $9.1 \times 10^3$ | $5.1 \times 10^4$ | 11 | 1.4 |
| 0.6 | 0.1 | $1.2 \times 10^5$ | $3.0 \times 10^4$ | 140 | $8.3 \times 10^{-1}$ |

Table 8b shows the relative effects created by the addition of specific amounts of $SiO_2$ and V to Example 7 (see FIG. 10).

It will appear from the above that the addition of both vanadium and silicon oxide to the specimen of the systems containing dysprosium (Dy) as the activator for making the barium titanate composition semiconductive is also very effective for increasing the positive temperature coefficient characteristic of resistivity and for obtaining a desired specific resistance value.

Figure 11:
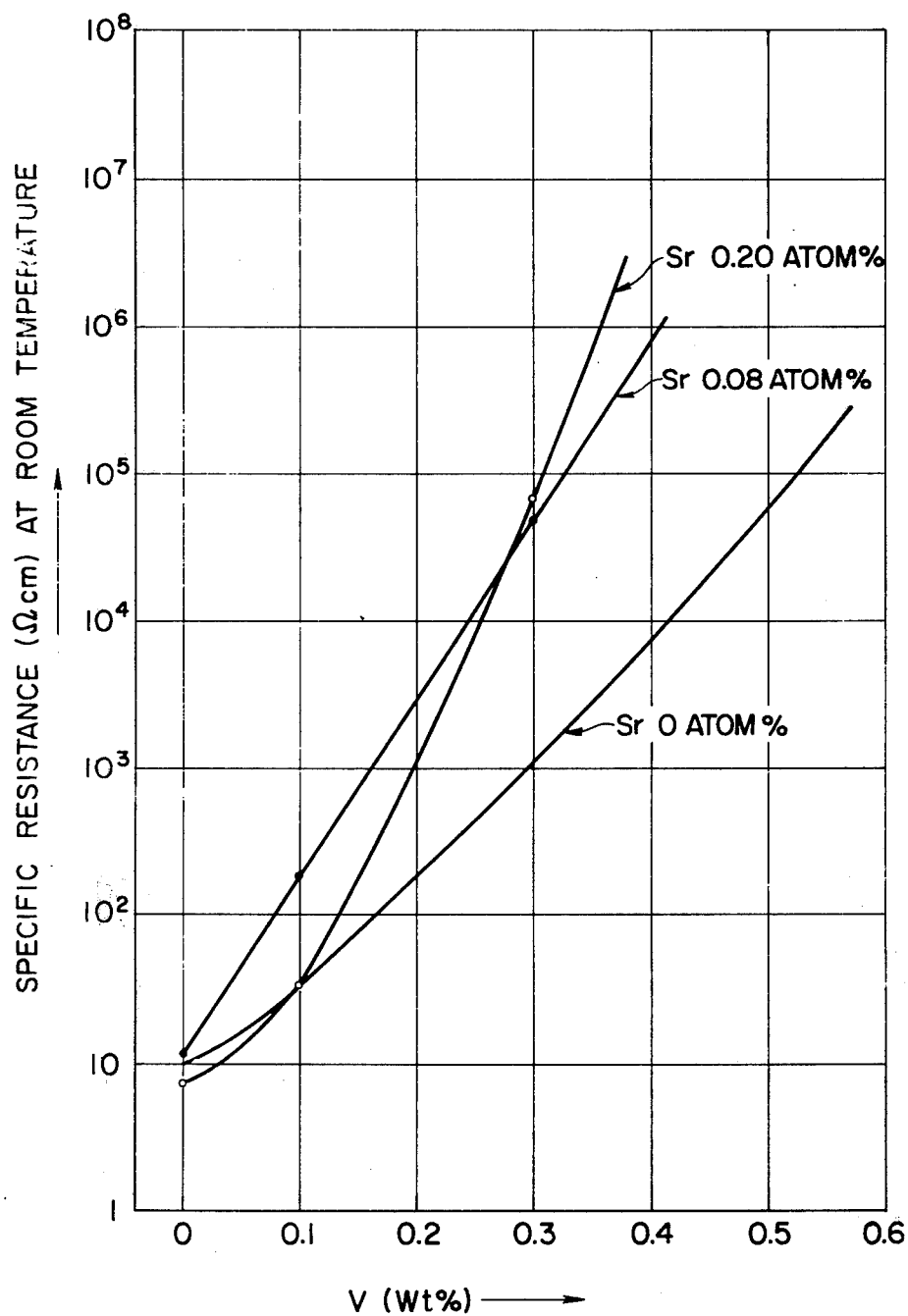

Further, also in the cases of employing other rare earth elements, antimony (Sb), bismuth (Bi), niobium (Nb) or tantalum (Ta) as the activator, the effect by the combined addition of vanadium and silicon oxide is also clearly observed.

ature at which the positive temperature coefficient characteristic of resistivity is exhibited is shifted by adding strontium but FIG. 11 shows that strontium also exerts an influence on the value of specific resistance at room temperature as is the case with vanadium and silicon oxide.

Table 10a

| Speciman Number | $M = \rho max/\rho min$ | $|B|$ (K) | M/Mo | $|B|/|B_0|$ |
|---|---|---|---|---|
| 1 | $Mo = 6.2 \times 10^3$ | $|B_0| = 1.6 \times 10^4$ | | |
| 2 | $2.4 \times 10^5$ | $3.6 \times 10^4$ | 39 | 2.3 |
| 3 | $5.7 \times 10^4$ | $4.5 \times 10^4$ | 8.7 | 2.8 |
| 4 | $Mo = 1.6 \times 10^3$ | $|B_0| = 7.3 \times 10^3$ | | |
| 5 | $7.2 \times 10^4$ | $1.5 \times 10^4$ | 45 | 2.1 |
| 6 | $5.8 \times 10^4$ | $2.1 \times 10^4$ | 36 | 2.9 |

EXAMPLE 8

$Ba_{0.9975-x} Sr_x Dy_{0.0025} TiO_3 + 0.6$ weight % of $SiO_2 + y$ weight % of V.

Barium carbonate ($BaCO_3$), strontium carbonate ($SrCO_3$), dysprosium oxide ($Dy_2O_3$) and titanium oxide ($TiO_2$) were sampled in the atomic ratio given in the Table 9 in connection with barium (Ba), strontium (Sr), dysprosium (Dy) and titanium (Ti) and a plurality of specimens of such composition were prepared. Vanadium pentoxide ($V_2O_5$) was added to the specimens in the ratios given in the Table 9 in the percent by weight of vanadium (V) and silicon oxide ($SiO_2$) was added to and mixed in the specimens in the ratio of 0.6 percent by weight.

The mixtures thus obtained were calcined at 1150° C for 2 hours, wherein the $V_2O_5$ was completely converted to $VO_2$. The calcined mixtures were then pulverized, moulded into discs, and fired at 1350° C for 2 hours. The specific resistance-temperature characteristics of these ceramic discs, which were measured with ohmic electrodes mounted on both sides of the discs, are shown in the Table 10 and in FIGS. 11 and 12.

Table 9

| Specimen Number | Amount of V added (weight %) | Atomic ratio | | | |
|---|---|---|---|---|---|
| | | Ba | Sr | Dy | Ti |
| 1 | 0 | | | | |
| 2 | 0.1 | 0.9175 | 0.080 | 0.0025 | 1 |
| 3 | 0.3 | | | | |
| 4 | 0 | | | | |
| 5 | 0.1 | 0.7975 | 0.200 | 0.0025 | 1 |
| 6 | 0.3 | | | | |

Table 10

| Specimen Number | Specific resistance Ωcm | | | |
|---|---|---|---|---|
| | 25° C | 100° C | 150° C | 200° C |
| 1 | $1.18 \times 10$ | $1.44 \times 10$ | $1.43 \times 10^3$ | $1.81 \times 10^4$ |
| 2 | $1.70 \times 10^2$ | $1.15 \times 10^2$ | $2.48 \times 10^6$ | $2.12 \times 10^7$ |
| 3 | $4.82 \times 10^3$ | $3.32 \times 10^3$ | $4.73 \times 10^7$ | $4.80 \times 10^7$ |
| 4 | 7.63 | $1.06 \times 10^2$ | $1.23 \times 10^3$ | $6.22 \times 10^3$ |
| 5 | $3.38 \times 10$ | $4.72 \times 10^3$ | $4.85 \times 10^5$ | $2.16 \times 10^6$ |
| 6 | $6.52 \times 10^3$ | $2.51 \times 10^7$ | $3.54 \times 10^8$ | $3.18 \times 10^8$ |

FIG. 11 shows the relationship between the amount of vanadium added and the specific resistance at room temperature in connection with the systems that the amount of strontium titanate ($SrTiO_3$) substituted is altered. These series contain silicon dioxide and have a tendency that the specific resistance change at room temperature with an increase in the amount of vanadium (V) added is very gentle and the specific resistance at room temperature can be easily controlled at a desired value. It is already well-known that the temper- Table 10a shows increase effected by the addition of specific amounts of V in specimens 2, 3, 5 and 6 of Example 8.

Figure 12:
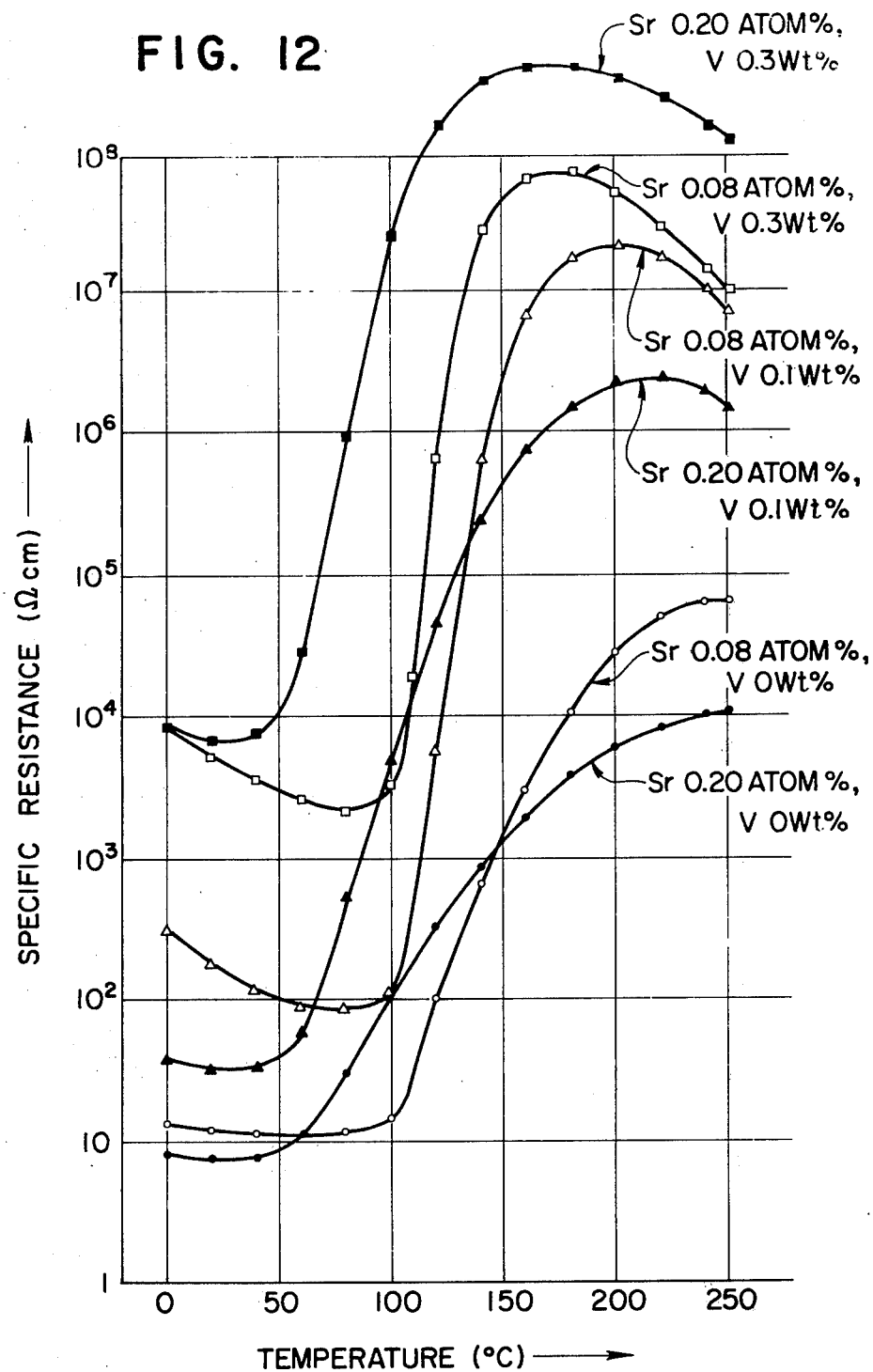

FIG. 12 illustrates the specific resistance-temperature characteristics of the specimens shown in FIG. 11. The effect by the combined addition of vanadium and silicon oxide is also clearly observed in the strontium titanate substitution systems.

Further, even by partial substitution with other titanate, zirconate or stannate such as lead titanate ($PbTiO_3$) or the like, the temperature at which the positive temperature coefficient characteristic of resistivity is exhibited can be shifted while maintaining the effect produced by the combined addition of vanadium and silicon oxide.

EXAMPLE 9

$Ba_{0.9975} Dy_{0.0025} TiO_3 +$ weight % of $SiO_2 + y$ weight % of V

Barium carbonate ($BaCO_3$), dysprosium oxide ($Dy_2O_3$) and titanium oxide ($TiO_2$) were sampled in a Ba:Dy:Ti atomic ratio of 0.9925:0.0025:1. Vanadium pentoxide ($V_2O_5$) was added to specimens in the percent by weight of vanadium (V) given in the Table 11 and then silicon oxide ($SiO_2$) was added to the specimens as indicated in the Table 11. The resulting mixtures were calcined at 1150° C. for 2 hours, wherein the $V_2O_5$ was completely converted to $VO_2$. The calcined mixtures were then pulverized and moulded into discs, which were further fired at 1350° C for 2 hours.

Figure 13:
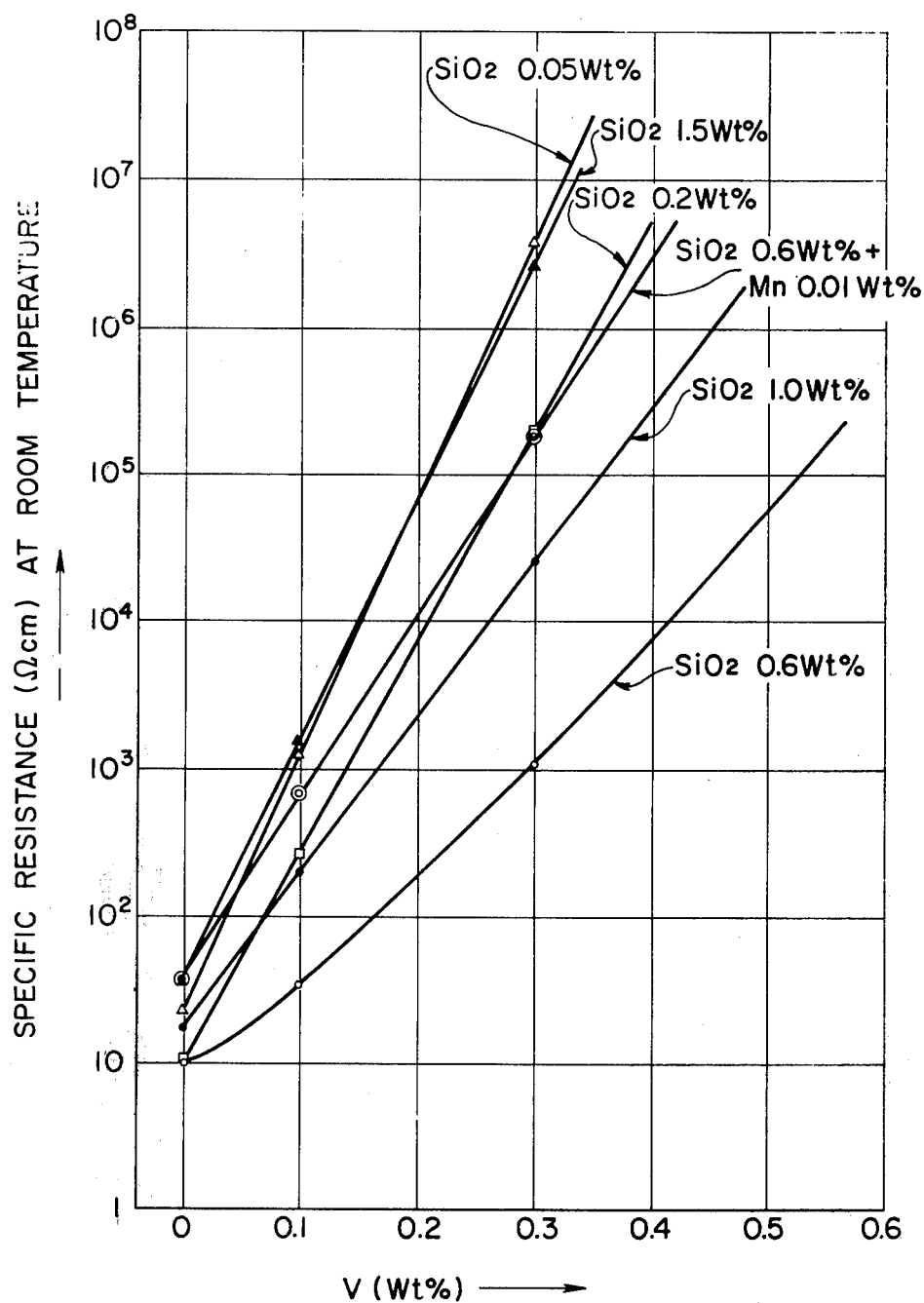

The specific resistance values of the ceramic discs at room temperature, which were measured with ohmic electrodes, for example, In-Ga electrodes mounted on both sides of the discs, are shown in the Table 11 and in FIG. 13.

Table 11

| Amounted added (weight %) | Specific resistance at room temperature (Ωcm) | | | |
|---|---|---|---|---|
| | V | | | |
| SiO₂ | O | 0.1 | 0.3 | |
| 0.05 | $2.24 \times 10$ | $1.23 \times 10^3$ | $3.75 \times 10^6$ | |
| 0.20 | $1.02 \times 10$ | $2.61 \times 10^2$ | $1.93 \times 10^5$ | |
| 0.60 | 9.98 | $3.34 \times 10$ | $1.15 \times 10^3$ | |
| 1.00 | $1.78 \times 10$ | $1.98 \times 10^2$ | $2.54 \times 10^4$ | |
| 1.50 | $3.64 \times 10$ | $1.52 \times 10^3$ | $2.78 \times 10^6$ | |

FIG. 13 illustrates the specific resistance value at room temperature with respect to the amount of vanadium (V) added in the case where dysprosium (Dy) is added as an activator for making the barium titanate composition semiconductive and the amount of silicon dioxide ($SiO_2$) added is altered in the range of 0.05 to 0.5 percent by weight. As will be seen from FIG. 13, the inclination of the curves becomes gentle with an increase in the amount of silicon oxide added but becomes steep again when the amount exceeds about 0.6 percent by weight. This apparently shows the function of silicon oxide in the effect resulting from the combined addition of vanadium and silicon oxide. In FIG. 13, substantially the same characteristics are exhibited in the cases of 0.05 percent by weight approximately close to zero and 1.5 percent by weight, so that the effective range of adding silicon oxide is 0.05 to 1.5 percent by weight.

EXAMPLE 10

$Ba_{0.9975} Dy_{0.0025} TiO_3$ + 0.6 weight % of $SiO_2$ + $x$ weight % of V + 0.01 weight % of Mn.

Barium carbonate ($BaCO_3$), dysprosium oxide ($Dy_2O_3$) and titanium oxide ($TiO_2$) were sampled in a Ba:Dy:Ti atomic ratio of 0.9975:0.0025:1. Manganese was added in the form of ions to the specimens in the amount of 0.01 percent by weight relative to the latter. At the same time, silicon dioxide ($SiO_2$) was added to the specimens in the amount of 0.6 percent by weight and vanadium pentoxide ($V_2O_5$) was added to the specimens in the amount given in the Table 12 expressed as wt% V. These mixtures were calcined at 1150° C for two hours wherein the $V_2O_5$ was completely converted to $VO_2$. The calcined mixtures were then pulverized, moulded into discs, and fired at 1350° C for 2 hours.

The specific resistance values of these ceramic discs at room temperature, which were measured with ohmic electrodes, for example, In-Ga electrodes mounted on both sides of the discs, are shown in the Table 11 and in FIG. 13 in comparison with those in the Example 9.

As will be apparent from the Table 12 and characteristics indicated by heavy lines in FIG. 13, even where manganese (Mn) is added for providing steep PTCR characteristic, the specific resistance at room temperature does not increase so much and the function of vanadium and silicon oxide making the specific resistance change at room temperature gentle is still maintained. Further, the effect by the combined addition of vanadium and silicon oxide is also clearly observed even if at least one of titanium (Ti), phosphorus (P), boron (B), aluminum (Al) and iron (Fe) or their compounds is added together with vanadium and silicon oxide.

Table 12

| Amount of V added (weight %) | Specific resistance at room temperature ($\Omega$cm) |
|---|---|
| 0 | $4.15 \times 10$ |
| 0.1 | $6.60 \times 10^2$ |
| 0.3 | $1.94 \times 10^5$ |

As has been described above in connection with the foregoing Examples, by the combined addition of vanadium and silicon oxide to semiconducting ceramics of the barium titanate are partially substituted with other elements or those containing an additive, the specific resistance value can be altered over a wide range of the amount of the additive and the total specific resistance change over the range of the temperature at which the positive temperature coefficient characteristic of resistivity is exhibited can be raised up to a value of about $10^5$.

Further, the negative temperature coefficient characteristic of resistivity below the aforesaid PTCR temperature is held unchanged irrespective of the addition of silicon oxide ($SiO_2$).

With the present invention, when the amount of vanadium added is less than 0.001 percent by weight, the total specific resistance change over the range of the temperature at which the positive temperature coefficient characteristic of resistivity is exhibited is substantially the same as that in the case of no vanadium being added, as shown in the Tables 7 and 8 and in FIGS. 6 and 9. Further, where the amount of vandium added exceeds 0.5 percent by weight, the specific resistance at room temperature becomes higher than $10^6 \Omega$cm and the specific resistance change with temperature greatly decreases as shown in the above-mentioned tables and figures. Moreover, even if the amount of silicon dioxide added is less than 0.05 percent by weight or more than 1.5 percent by weight, an increase in the specific resistance at room temperature with an increase in the amount of vanadium added becomes rapid, as shown in Table 11 and in FIG. 13, and a desired specific resistance value is difficult to obtain. Such phenomena are similarly observed in other semiconducting ceramics of the barium titanate systems or the semiconducting ceramics containing the additives. For the above reasons, the amount of vanadium added in this invention is limited within the range of 0.001 to 0.5 percent by weight and that of silicon dioxide is limited within the range of 0.05 to 1.5 percent by weight.

In the present invention, the permissible range of the additive is wide and the electrical characteristic gently changes within that range, so that it is possible with this invention to mass produce semiconducting ceramics whose specific resistance greatly changes with temperature and to provide semiconducting ceramics of many kinds of electrical characteristics.

What is claimed is:
1. A fired barium titanate ceramic semiconductor composition containing:
   barium titanate;
   at least one semiconductor activator selected from the group consisting of rare earth elements, Sb, Bi, Nb and Ta; and
   vanadium oxide in the amount of about 0.001 to 0.5 percent V by weight, based on $BaTiO_3$, said vanadium having a valence of no greater than 4.
2. The semiconductor composition of claim 1 comprising about 0.05 to 1.5 percent by weight $SiO_2$.
3. The semiconductor composition of claim 1, wherein the titanate is partially substituted by at least one member of the group consisting of Sr, Pb, another titanate, zirconate and stannate.
4. A fired barium titanate positive temperature coefficient semiconductor ceramic composition consisting essentially of
   a homogeneous barium titanate mixture having about 0.001 to 0.5 weight percent vanadium at a valence not greater than 4, and an activating amount of at least one semiconductive activator selected from the group consisting of rareearth elements, Sb, Bi, Nb and Ta.
5. An improved process for making a semiconducting ceramic composition, having a positive temperature coefficient characteristic of resistivity exhibited at a predetermined temperature and a predetermined range of specific resistance corresponding to a change with temperature from said predetermined temperature corresponding to a first value of specific resistance in said predetermined range to a maximum temperature corresponding to the maximum value of specific resistance in said predetermined range, including the steps of:

mixing a barium titanate ceramic forming material with a predetermined amount of a semi-conductive activator compound selected from the group consisting of rare earth elements, Sb, Bi, Nb, and Ta to control the semi-conducting properties of said ceramic composition;

calcining the mixture at approximately 1150° C for about two hours;

pulverizing said calcined mixture;

molding said pulverized mixture into a predetermined shape;

wherein the improvement comprises adding vanadium in a range of about 0.001 to 0.5 weight percent to said mixture, prior to said calcining step, for controlling the specific resistance at room temperature and increasing the range of change in the specific resistance of said ceramic composition in a range of from 1.2 to 140 times said predetermined range; and firing said molded mixture in a temperature range of approximately 1300° to 1400° C for approximately two hours, thereby producing a semi-conducting ceramic composition having a positive temperature coefficient characteristic of resistivity.

* * * * *

UNITED STATES PATENT AND TRADEMARK OFFICE
CERTIFICATE OF CORRECTION

PATENT NO. : 4,022,716
DATED      : May 10, 1977
INVENTOR(S) : Hisayoshi Ueoka et al It is certified that error appears in the above-identified patent and that said Letters Patent are hereby corrected as shown below:

Column 3, line 39, change "resistancetemperature" to -- resistance-temperature --.

Column 5, in "Table 2A", change "$|B|$" to -- $(K)$ -- $|B|$ --.

Column 6, in line 20, change "resistancetemperature" to -- resistance-temperature --.

Column 6, in "Table 3", change "1.26;33 $10^8$ to -- 1.26 x $10^8$ --.

Column 6, in Table 3a", change "$|B|$" to -- $(K)$ -- $|B|$ --.

Column 8, line 18, change "zerconate" to -- zirconate --.

Column 9, line 29, change "seniconductive" to -- semiconductive --.

Column 9, line 48, change "0.100 0.300" to -- 0.100, 0.300 --.

Column 16, line 63, change "rareearth" to -- rare earth --.

Signed and Sealed this thirtieth Day of August 1977

[SEAL]

Attest:

RUTH C. MASON
Attesting Officer

C. MARSHALL DANN
Commissioner of Patents and Trademarks